Figure 1:
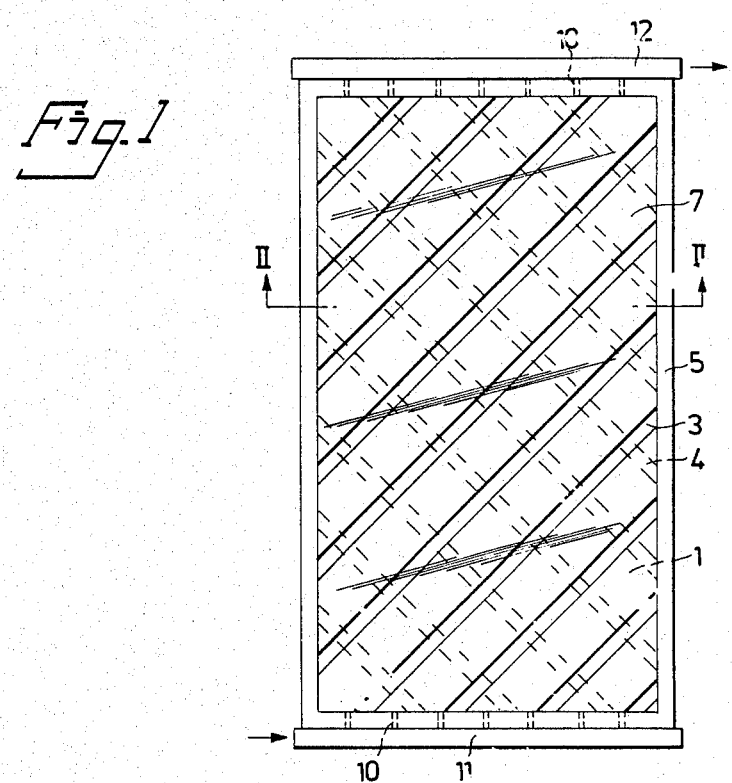

United States Patent [19]

Janson

[11] Patent Number: 4,534,337
[45] Date of Patent: Aug. 13, 1985

[54] SOLAR-ENERGY COLLECTOR

[76] Inventor: Gösta Janson, Badvägen 7-9, S-139 00 Värmdö, Sweden

[21] Appl. No.: 557,291

[22] PCT Filed: Apr. 13, 1983

[86] PCT No.: PCT/SE83/00134
§ 371 Date: Nov. 3, 1983
§ 102(e) Date: Nov. 3, 1983

[87] PCT Pub. No.: WO83/03660
PCT Pub. Date: Oct. 27, 1983

[30] Foreign Application Priority Data

Apr. 14, 1982 [SE] Sweden .............................. 8202322

[51] Int. Cl.³ .............................................. F24J 3/02
[52] U.S. Cl. ..................................... 126/445; 165/166
[58] Field of Search ................. 126/444, 445; 165/166

[56] References Cited

U.S. PATENT DOCUMENTS 4,307,779 12/1981 Johansson et al. .................. 165/166
4,470,455 9/1984 Sacca ................................... 165/166

FOREIGN PATENT DOCUMENTS 2911191 10/1980 Fed. Rep. of Germany ...... 126/445
2045423 10/1980 United Kingdom ................ 126/445

Primary Examiner—Carroll B. Dority, Jr.
Attorney, Agent, or Firm—Sughrue, Mion, Zinn, Macpeak and Seas

[57] ABSTRACT

A solar-energy collector having an absorber unit comprising two plates (1, 2) of rigid material, having an intermediate space for a flowing medium to be heated. In order to obtain a form-stable unit having temperature equilizing properties, the two plates (1, 2) are wave-shaped (3, 4) in mutually intersecting directions, symmetrically in relation to the main direction of flow of the medium, and the plates abut each other at the points of intersection, at which points the plates are joined together by welding, adhesive bonding or the like.

3 Claims, 7 Drawing Figures

SOLAR-ENERGY COLLECTOR

The present invention relates to a solar-energy collector.

Solar-energy collectors of this kind are still encumbered with a number of cost-increasing disadvantages. In order to withstand the mechanical stresses and strains which are created partly as a result of external influences and partly as a result of internal pressures in the absorber unit, it is necessary to use a particularly strong and robust material, normally copper sheet or aluminium sheet, and sometimes steel sheet, particularly when the heat-transport medium is air. For the same reason, the cavity is normally divided into a plurality of mutually parallel ducts. Particularly when such ducts are provided, and even in the absence of said ducts, the flow of medium through the cavity can readily become unevenly distributed across the whole of the cross-section of the cavity, requiring manual adjustments to be made, so that the whole of the collector surface can be utilized.

The object of the invention is to provide a solar-energy collector having an absorber unit which, despite the use of lightweight and weak materials, is able to withstand high external and internal pressures, and which is constructed so as to provide absolutely uniform distribution of the medium flow across the whole cross-section and area of the collector.

This object is achieved with a solar-energy collector having a wave-form configuration which, in combination with the connections at the abutment locations, provides fixation of the wave-form and also affords considerable resistance to bending. In addition, as a result of the wave-form of respective plates, the flow of medium is also divided into a plurality of mutually intersecting part-flows, and each time two part-flows intersect each other, they are divided into further part-flows. At the same time, there is obtained additional contribution from adjacent part-flows. Even though the collector should be unevenly irradiated, so that part of the collector becomes too hot with subsequent impairment of its efficiency, the temperature will be rapidly equilized throughout, so as to constantly obtain the highest possible efficiency.

Figure 2:
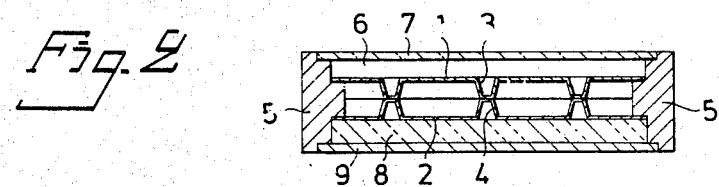
Figure 3:
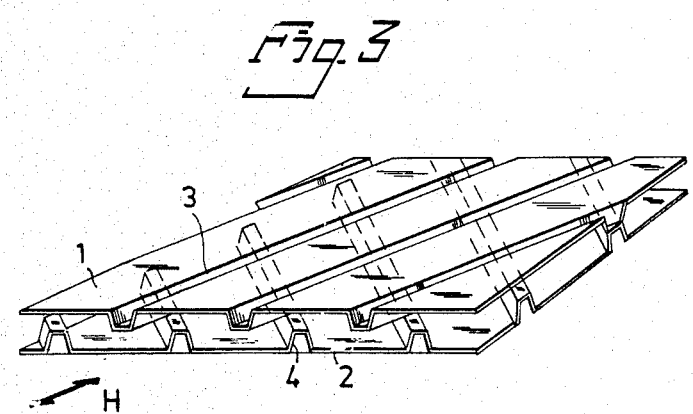
Figure 4:
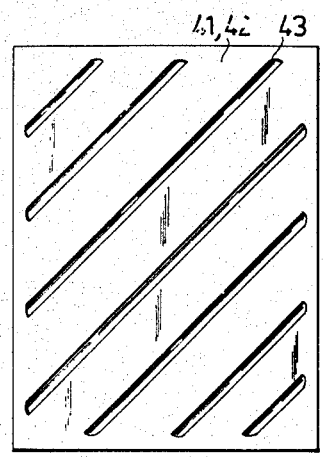
Figure 5:
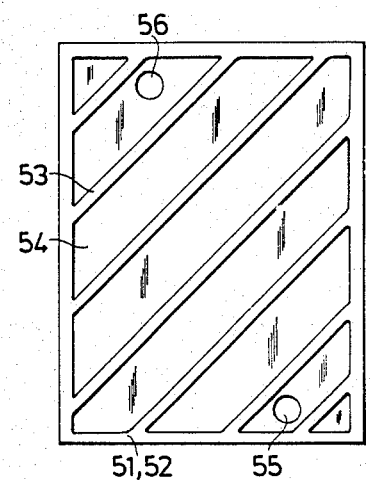
Figure 6:
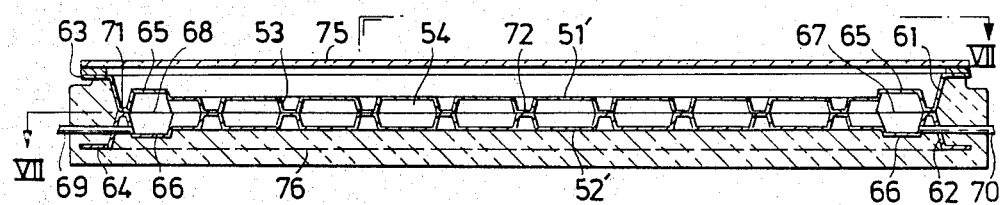
Figure 7:
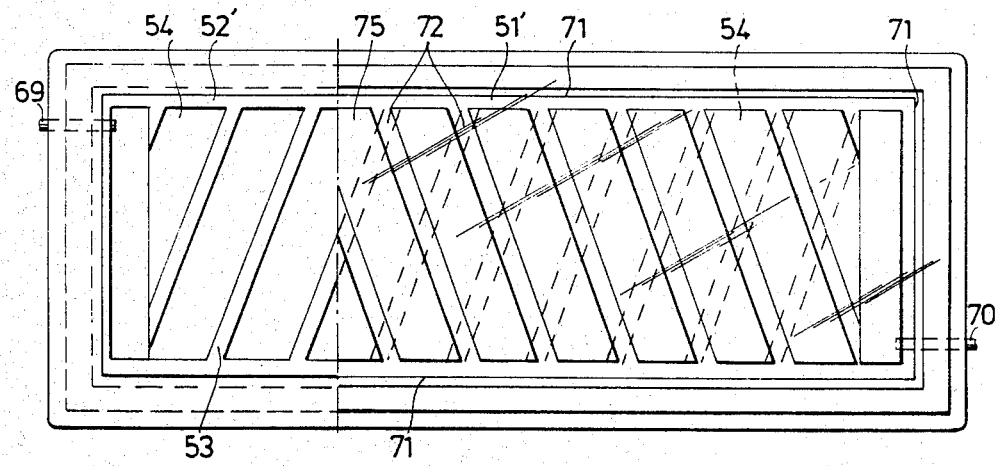

The invention will now be described more clearly with reference to various embodiments of solar-energy collectors according to the invention illustrated in the accompanying drawings, in which FIG. 1 is a front view of a first embodiment, FIG. 2 is a cross-sectional view taken on the line II—II in FIG. 1, FIG. 3 is a detail view in perspective of the two plates illustrated in FIGS. 1 and 2, FIGS. 4 and 5 are each front views of a plate having pressed therein recesses to form a wave-shape sector part on respective plates, and FIGS. 6 and 7 are respectively a cross-sectional view and a view taken on the line VII—VII in FIG. 6 of a preferred embodiment of the invention.

FIGS. 1-3 illustrate two mutually parallel plates 1, 2 made from thin aluminium sheet and having mutually facing, inwardly pressed ridges 3, 4 which cross each other and which are connected to one another at the locations of intersection by means of an adhesive or spot welds. The plates are connected around their periphery, in some suitable manner, with a ring-like frame 5 constructed from aluminium section having abutment surfaces adapted to the wave-form of the plates. The height of the frame 5 is sufficient to form an air-filled cavity 6 between the absorber unit 1, 2, 3, 4 and a cover plate 7 made of transparent material, for example glass, joined to the frame 5, and a cavity for accommodating heat-insulating material 8 between absorber units and a rear side 9 attached to the frame.

At each end of the solar-energy collector, the frame 5 is provied with through-passing passages 10, which connect the cavity between the plates 1 and 2 to inlet and outlet passages 11, 12 respectively for the medium to be heated.

The main direction of flow of the medium is indicated by an arrow H in FIG. 3, from which figure it will be seen that the flow of medium will be divided into a plurality of part-flows which are constantly divided up and mixed in a plurality of eddy-currents, which results in rapid and complete temperature equalization should irregularities occur.

A similar embodiment can also be obtained with the pressed plates 41, 42 or 51, 52 as illustrated in FIGS. 4 and 5; in the FIG. 4 embodiment ridges 43 have been pressed into planar plates 41, 42, while in the FIG. 5 embodiment grooves 54 have been pressed into planar plates 51, 52 to leave ridges 53 therebetween. In this latter case, the plates 51, 52 can be joined directly together around the peripheries thereof, although it is then necessary to provide separate inlet and outlet openings 55 and 56 respectively.

The ridges are pressed into the plates 41, 42 in a manner such that the plates are mutually identical and so that, subequent to turning one plate through 180° in relation to the other plate, the ridges 43 will cross one another. The same applies to the plates 51, 52.

The absorber units need not necessarily comprise two metal plates. One or both plates way optionally comprise a plastics material. The plate onto which radiation from the sun falls may be transparent and the other darkly coloured. When a liquid medium is used, the liquid may also be darkly coloured, so that the liquid itself is heated by the sun's rays in a known manner.

As will be understood, when a gaseous medium, such as air, is used the distance between the wave-shaped surfaces must be greater than when a liquid medium is used.

The preferred embodiment of a solar-energy collector according to the invention illustrated in FIGS. 6 and 7 is based mainly on the type of absorber plates 51', 52' illustrated in FIG. 5.

In this embodiment, the plates, made of steel sheet approximately 1 mm in thickness, are supplemented with upstanding rims 61, 62, each of which extends around the periphery of its respective plate and which are terminated with a planar-ring-like flange 63, 64. The two plates are also provided with mutually opposite, transversely extending raised portions 65, 66, which together form two distributing ducts 67, 68 which communicate with the mutually intersecting grooves or channels 54 and with a respective inlet and outlet pipe-connector 69, 70.

A continuous weld extends around the bottom portions 71 of the rims 61, 62 and there joins the plates 51', 52' together. Spot welds are also made at the major part of the intersection locations 72 of the ridges 53, thereby to provide a particularly rigid absorber.

Each absorber can be manufactured from two plates 51', 52' which are similarly profiled and produced in a large press and which subsequent to turning or rotating one of the plates are welded back-to-back in an automatic welding machine and provided with inlet and outlet pipe-connectors 69, 70. A plastics cover 75 is then arranged on the flanges 63, and on the opposite side there is temporarily arranged a mould (not shown) by means of which a block 76 of cellular plastics can be formed on the rear side of the absorber, the rim 62 and the flange 64 serving as reinforcing means within the block 76. Because the absorber is particularly rigid, no casing is required.

I claim:

1. A solar-energy collector having an absorber unit which comprises two plates (1, 2) of rigid material having the requisite resistance to corrosion and heat, said plates being sealingly connected together around their peripheries to form an intermediate, wide, elongate cavity of low height for a medium to be heated, and which is provided at two mutually opposite ends with inlet and outlet openings (10) for said medium, wherein the two plates are wave-formed (3, 4) over at least substantially the whole of their surfaces in mutually crossing directions, and the waves of the respective plates are oriented at equal but opposite angles in relation to the main direction of flow (H) of the medium; and in that the plates abut each other at those locations where the waves cross each other, the plates being joined together at at least a part of said locations, by welding, adhesive bonding or the like, and wherein the two plates are joined around their peripheries with a common ring-like frame (5) having abutment surfaces adapted to the wave-form of the plates, said frame also being provided with abutment surfaces for receiving front and rear cover plates (7, 9) for the collector.

2. A solar-energy collector according to claim 1, wherein the wave-form of the plates is such that mutually abutting wave surfaces are planar.

3. A solar-energy collector having an absorber unit which comprises two plates (51', 52') of rigid material having the requisite resistance to corrosion and heat, said plates being sealingly connected together around their peripheries to form an intermediate, wide, elongate cavity of low height for a medium to be heated, and which is provided at two mutually opposite ends with inlet and outlet openings (69, 70) for said medium, wherein the two plates are wave-formed (53) over at least substantially the whole of their surfaces in mutually crossing directions oblique to the main direction of flow of the medium, and the waves of the respective plates are oriented at equal but opposite angles in relation to said main direction of flow of the medium; and in that the plate abut each other at those locations where the waves cross each other, the plates being joined together at at least a part of said locations, by welding, adhesive bonding or the like, and wherein the peripheries of the plates are located in a common plane with the intersection locations of the waves, and the plates are joined together around said peripheries, wherein said plates are provided around said peripheries with rims (61, 62) which project away from each other and which are terminated with flanges (63, 64), of which (63) forms fastening means for a transparent cover plate (75), and the other (64) together with its associated rim (62) constitutes a reinforcement for a block (76) of cellular plastics material, or like insulating material, arranged on the absorber, preferably by moulding.

* * * * *